United States Patent Office 3,320,185
Patented May 16, 1967

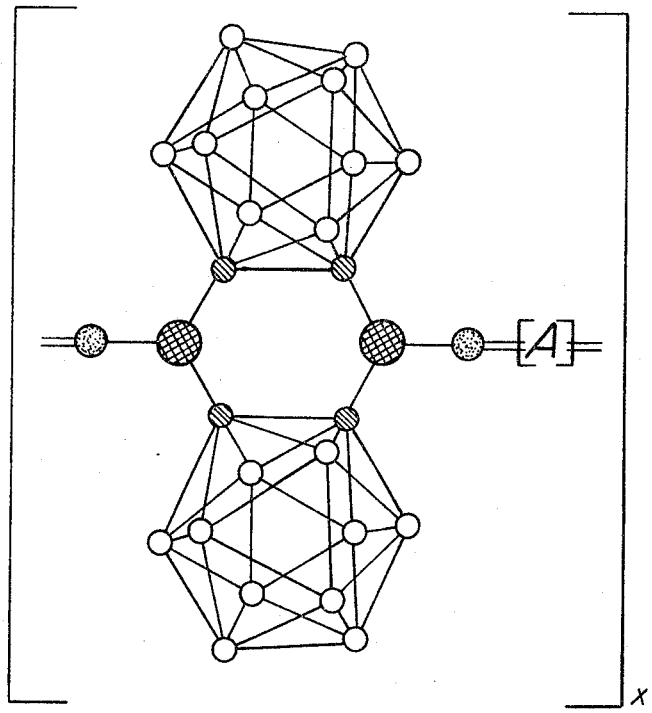
○ BORON
○ CARBON
● NITROGEN
● PHOSPHORUS
(HYDROGEN ATOMS ON BORON OMITTED FOR CLARITY)

3,320,185
NOVEL POLYMERS FROM CONDENSATION OF DIMERIC AZIDOPHOSPHA (III)-CARBORANE AND DIPHOSPHINE
Roy P. Alexander, Killingworth, and Hansjuergen A. Schroeder, New Haven, Conn., assignors to Olin Mathieson Chemical Corporation, a corporation of Virginia
Filed Nov. 13, 1963, Ser. No. 323,394
2 Claims. (Cl. 260—2)

This invention relates to linear polymers prepared by the reaction of a disphosphine with a dimeric azidophospha (III)-carborane. More particularly this invention relates to linear polymeric phosphinocarboranes having phosphorus-nitrogen-phosphorus bonds, and to a method for their preparation.

The novel linear polymers of this invention contain a multiplicity of structural units of the following formula:

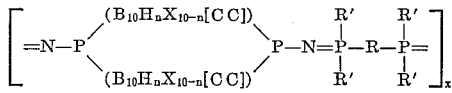

In the above formula R is an alkylene radical having from 1 to 8 carbon atoms, an arylene radical having not more than 8 carbon atoms or the biphenylene radical, R' is an aryl radical selected from the group consisting of phenyl, tolyl, xylyl, naphtyl or biphenylyl, X is a halogen selected from the group consisting of chlorine, bromine and iodine and $n$ is an integer of from 0 to 10 inclusive.

The novel polymers of this invention are prepared by the condensation of a dimeric azidophospha (III)-carborane having the formula:

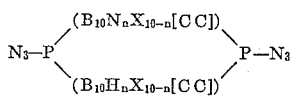

where X and $n$ have the same meaning as previously described, with a diphosphine of the formula:

$$R'_2P-R-PR'_2$$

wherein R and R' have the same meaning as preivously set forth, in the presence of an inert organic solvent at temperatures ranging from about 0° C. to about 150°C and preferably at temperatures of from about 10° C. to about 100° C. Generally about 1 mole of the dimeric azidophospha (III)-carborane will be reacted with 1 mole of the diphosphine. Generally the reaction between the diphosphine and the dimeric azidophospha (III)-carborane will be completed in from about 0.5 to about 20 hours the preferred reaction time is from about 1 to about 6 hours.

A wide variety of organic solvents can be utilized in the process of this invention. Such solvents include aromatic hydrocarbon solvents such as benzene, toluene, and xylene, and materials such as dioxane, acetonitrile, propionitrile, etc. as well as chlorinated hydrocarbons such as chloroform, etc. Any organic solvent can be employed in which the reactants are soluble and which is inert with respect to the reactants and the product. The polymers of this invention are soluble in a number of the organic solvent proposed. In such cases on addition of a material such as petroleum ether, hexane, heptane, etc. to the reaction mixture the polymeric products precipitate and they can be recovered by a variety of methods known in the art, such as by centrifugation, decantation, filtration, etc. Purification of the polymer products can be conveniently achieved by washing with hot petroleum ether, pentane, hexane, or heptane, etc.

The pressure at which process is carried out is not critical and pressures varying from subatmospheric up to 15 atmospheres or more can be employed.

In Alexander and Schroeder application S.N. 323,416 for Product and Method, filed Nov. 13, 1963, a method for preparing the dimeric azidophospha (III)-carboranes employed as starting materials in this invention is set forth. For example, the compound dimeric azidophospha (III)-carborane which has the formula:

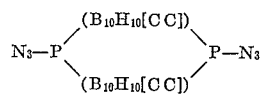

can be prepared by reacting sodium azide with the compound:

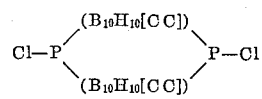

at a temperature of about 0° C. in the presence of ethanol.

Disphosphines useful in this invention include, for example, 1,2-bis(diphenylphosphino) ethane, 1,2-bis(ditolylphosphino) ethane, 1,2-bis(dibiphenylphosphino) ethane, 1,2 - bis(diphenylphosphino) isopropane, 1,3 - bis (diphenylphosphino) propane, 1,4 - bis(diphenylphosphino) butane, 1,3-bis(dixylylphosphino) propane and 1,3-bis(diphenylphosphino) pentane. Other useful diphosphines include, 1,4-bis(diphenylphosphino) benzene, 2,5-bis(diphenylphosphino) toluene, 2,5 - bis(diphenylphosphino) xylene, 1,4-bis(ditolylphosphino) benzene, 1,4-bis (dixylylphosphino) benzene, 2,5 - bis(dixylylphosphino) toluene, 1,4-bis(dinaphthylphosphino) benzene, 1,4-bis (dinaphthylphosphino) xylene, 1,4 - bis(dibiphenylphosphino) benzene, 2,5 - bis(dibiphenylphosphino) toluene, 1,3-bis(diphenylphosphino) benzene, p-bis(diphenylphosphino) biphenyl, etc.

The polymers of this invention which have molecular weights between about 2000 and about 5000 can be compounded with inert mineral fillers such as asbestos, and then pressure molded to form gaskets, or bushings which are suitable for use in high pressure and high temperature applications. The composites thus obtained are distinguished from other polymeric materials in that they exhibit good tensile strength after exposure to high temperatures. If the products of this invention are heated at temperatures as high as 426° C. (800° F.) for 1 hour a weight loss of only 1 percent is experienced and the decrease in tensile strength is less than 20 percent.

This invention is further illustrated by the following examples.

Example 1

Addition of cold benzene (75 ml.) to a mixture of

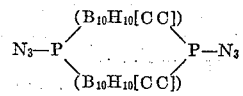

(3.45 g., 0.008 mole) and p-[(C<sub>6</sub>H<sub>5</sub>)<sub>2</sub>P]<sub>2</sub>C<sub>6</sub>H<sub>4</sub> (3.55 g., 0.008 mole) produced with evolution of nitrogen, a clear, purple solution. After the solution had been stirred at 20° for 1 hour, followed by refluxing for 2 hours, the color changed to pale-blue. The small amount of solid present was removed by filtration and the filtrate was poured into 500 ml. of petroleum ether. The solid which separated, was recovered by filtration and purified by washing with hot petroleum ether. Yield of polymer product (Product A): 5.9 g. (90 percent of the theoretical amount); M.P. 235–50°.

*Analysis.*—Calc'd for $(C_{34}H_{44}B_{20}N_2P_4)_x$ (molecular weight—821.0): C, 49.74; H, 5.40; B, 26.36; N, 3.41; P, 15.09. Found: C, 50.20; H, 5.65; B, 26.06; N, 3.05; P, 14.59; molecular weight: 2367.

By molecular weight determination and by infrared analysis it was determined that the formula of the polymer (Product A) was:

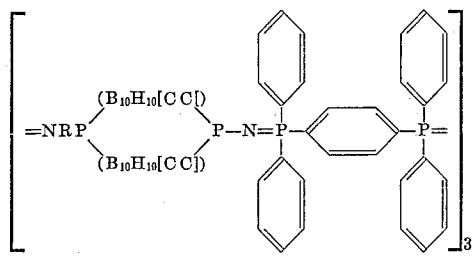

*Examples II–VI*

Several experiments were conducted in the same manner as described in Example I. The relevant data are summarized in Table 1:

tained by means of two clamps tightened with a torque wrench. The mold was transferred into an oven and preheated at 150° C. for ½ hour, then cured at 350° C. (662° F.) for 1 hour. The hard rectangular plate thus obtained weighed 46.93 g. (Weight loss: 1.07 g. equal to 2.22 percent of the weight of the starting material.) The plate was cut in strips of 0.245 in. x 0.5 in. x 3 in. dimensions with a silicon-carbide cutting wheel. Four such strips were tested in a Tinius and Olsen tensile strength tester at a test speed of 0.025 in./min., resulting in an average tensile strength of 3348 p.s.i. Five such strips were heated at 426° C. (800° F.) for 1 hour in a nitrogen atmosphere. During this treatment the strips lost 1 percent of total weight, turned somewhat darker in color and their average tensile strength was reduced to 2784 p.s.i. (corresponding to a 16.8 percent loss in tensile strength).

The structural formula for the polymer formed in Example I (Product A) is the same as the structural formula shown in the figure with the exception that [A] is replaced by the radical:

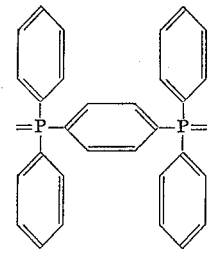

TABLE 1

| Example | Dimeric azidophospha (III)-carborane | | 1,4-bis(diphenylphosphino)-benzene | | | Yield of polymer product (percent) |
|---|---|---|---|---|---|---|
| | (Grams) | (Moles) | (Grams) | (Moles) | (Grams) | |
| II | 2.36 | 0.0055 | 2.44 | 0.0055 | 4.0 | 89.0 |
| III | 3.45 | 0.008 | 3.55 | 0.008 | 6.3 | 96.0 |
| IV | 2.58 | 0.006 | 2.68 | 0.006 | 4.1 | 83.3 |
| V | 2.15 | 0.005 | 2.23 | 0.005 | 3.3 | 80.5 |
| VI | 5.42 | 0.013 | 5.62 | 0.013 | 10.3 | 96.5 |

*Example VII*

A mixture of dimeric azidophospha (III)-carborane (1.0 g., 0.0023 mole), 1,4-bis(diphenylphosphino)-benzene (1.04 g., 0.0023 mole) and acetonitrile (50 ml.) was refluxed for 5 hours. The solvent was decanted from the solid reaction product, which was washed with petroleum ether and dried in vacuo; yield of polymer product: 1.0 g. (52.3 percent of the theoretical amount), M.P. 232–250° C.

*Example VIII*

A clear solution of 2.15 g. (0.005 mole) of dimeric azidophospha (III)-carborane, 2.23 g. (0.005 mole) of 1,4-bis(diphenylphosphino)-benzene and 100 ml. of chloroform was stirred for 1 hour at 25° C., then refluxed for 5 hours, and finally poured into 500 ml. of petroleum ether. The precipitate thus obtained was recovered by filtration and, after washing with petroleum ether, dried in vacuo. Yield of polymer product: 3.64 g. (88.8 percent of the theoretical amount).

*Example IX*

A mixture of 12 g. of polymeric product of the type produced in Example I and 36 g. of asbestos (purified acid washed, medium fibre) was wetted with 72 ml. of hexane and charged into a stainless steel mold consisting of a steel block (5¼ in. x 2 in. single cavity) and two steel forces. A pressure of 2000 p.s.i. was applied and main-

What is claimed is:

1. A linear polymeric condensation product having as a repeating group the structure:

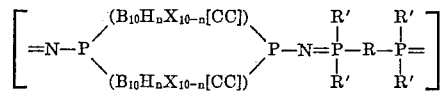

wherein X is a halogen selected from the group consisting of chlorine, bromine and iodine, n is an integer from 0 to 10 inclusive, R is selected from the group consisting of an alkylene radical having from 1 to 8 carbon atoms, an arylene radical having not more than 8 carbon atoms and diphenylene, and R' is selected from the group consisting of phenyl, tolyl, xylyl, napthyl and biphenylyl; the molecular weight of the said linear polymeric product being from about 2000 to about 5000.

2. The linear polymeric condensation product of claim 1 wherein R is phenylene and $R_2$ is phenyl.

References Cited by the Examiner

UNITED STATES PATENTS 3,155,630  11/1964  Schroeder _____ 260—2

OTHER REFERENCES

Alexander et al.: "Inorganic Chemistry," vol. 2 (1963), pp. 1107–10 (QD1 17).

SAMUEL H. BLECH, *Primary Examiner.*